United States Patent
Bancon et al.

(10) Patent No.: US 7,320,187 B2
(45) Date of Patent: Jan. 22, 2008

(54) DEVICE FOR BLOWING A FLUID ON AT LEAST A SURFACE OF A THIN ELEMENT AND ASSOCIATED BLOWING UNIT

(75) Inventors: Georges Bancon, Chalon-sur-Saone (FR); Jean-Jacques Bris, Bey (FR); Francois Bonnamour, Chalon sur Saone (FR)

(73) Assignee: Saint-Gobain Seva, Chalon sur Saone (FR)

( * ) Notice: Subject to any disclaimer, the term of this patent is extended or adjusted under 35 U.S.C. 154(b) by 0 days.

(21) Appl. No.: 10/468,001

(22) PCT Filed: Feb. 13, 2002

(86) PCT No.: PCT/FR02/00540

§ 371 (c)(1),
(2), (4) Date: Aug. 21, 2003

(87) PCT Pub. No.: WO02/068349

PCT Pub. Date: Sep. 6, 2002

(65) Prior Publication Data

US 2004/0074106 A1    Apr. 22, 2004

(30) Foreign Application Priority Data

Feb. 23, 2001 (FR) .................................. 01 02707

(51) Int. Cl.
*F26B 13/00* (2006.01)
(52) U.S. Cl. .............................. 34/639; 34/620; 34/624; 34/638; 34/656
(58) Field of Classification Search .................. 34/618, 34/620, 623, 624, 629, 636, 638, 639, 652, 34/653, 654, 655, 656
See application file for complete search history.

(56) References Cited

U.S. PATENT DOCUMENTS

| | | | | |
|---|---|---|---|---|
| 4,137,649 A | * | 2/1979 | Fleissner | 34/646 |
| 4,153,236 A | * | 5/1979 | Elhaus | 34/655 |
| 4,227,317 A | * | 10/1980 | Fleissner | 34/636 |
| 4,320,587 A | * | 3/1982 | Vits | 34/643 |
| 4,339,259 A | * | 7/1982 | Paudice et al. | 65/104 |
| 4,515,622 A | | 5/1985 | McMaster et al. | |
| 4,597,193 A | * | 7/1986 | Kallfass | 34/224 |
| 5,105,562 A | * | 4/1992 | Hella et al. | 34/643 |
| 5,150,534 A | * | 9/1992 | Kramer | 34/638 |
| 5,697,999 A | | 12/1997 | Reunamaki | |
| 6,231,001 B1 | | 5/2001 | Kramer et al. | |

FOREIGN PATENT DOCUMENTS

DE        40 10 280        10/1991

(Continued)

*Primary Examiner*—Jiping Lu
(74) *Attorney, Agent, or Firm*—Oblon, Spivak, McClelland, Maier & Neustadt, P.C.

(57) ABSTRACT

The invention relates to a device for blowing a fluid onto at least one face of a thin element of the band type, comprising, within a containment (2) having a horizontal longitudinal axis (XX') corresponding to the axis of travel of the band, at least one radial-flow fan (3) with a vertical axis (ZZ'), having at least one outlet connected to at least one pipe (51, 52) for feeding nozzles (43) directed towards the said face, characterized in that the nozzles (43) induce fluid jets in at least one plane perpendicular to the direction (XX') of travel of the said band.

44 Claims, 4 Drawing Sheets

FOREIGN PATENT DOCUMENTS

| | | |
|---|---|---|
| DE | 42 19 003 | 12/1993 |
| EP | 0 030 340 | 6/1981 |
| EP | 0 581 742 | 2/1994 |
| EP | 0 786 437 | 7/1997 |
| EP | 0 864 519 A1 | 9/1998 |
| RU | 1630229 | 10/1994 |

* cited by examiner

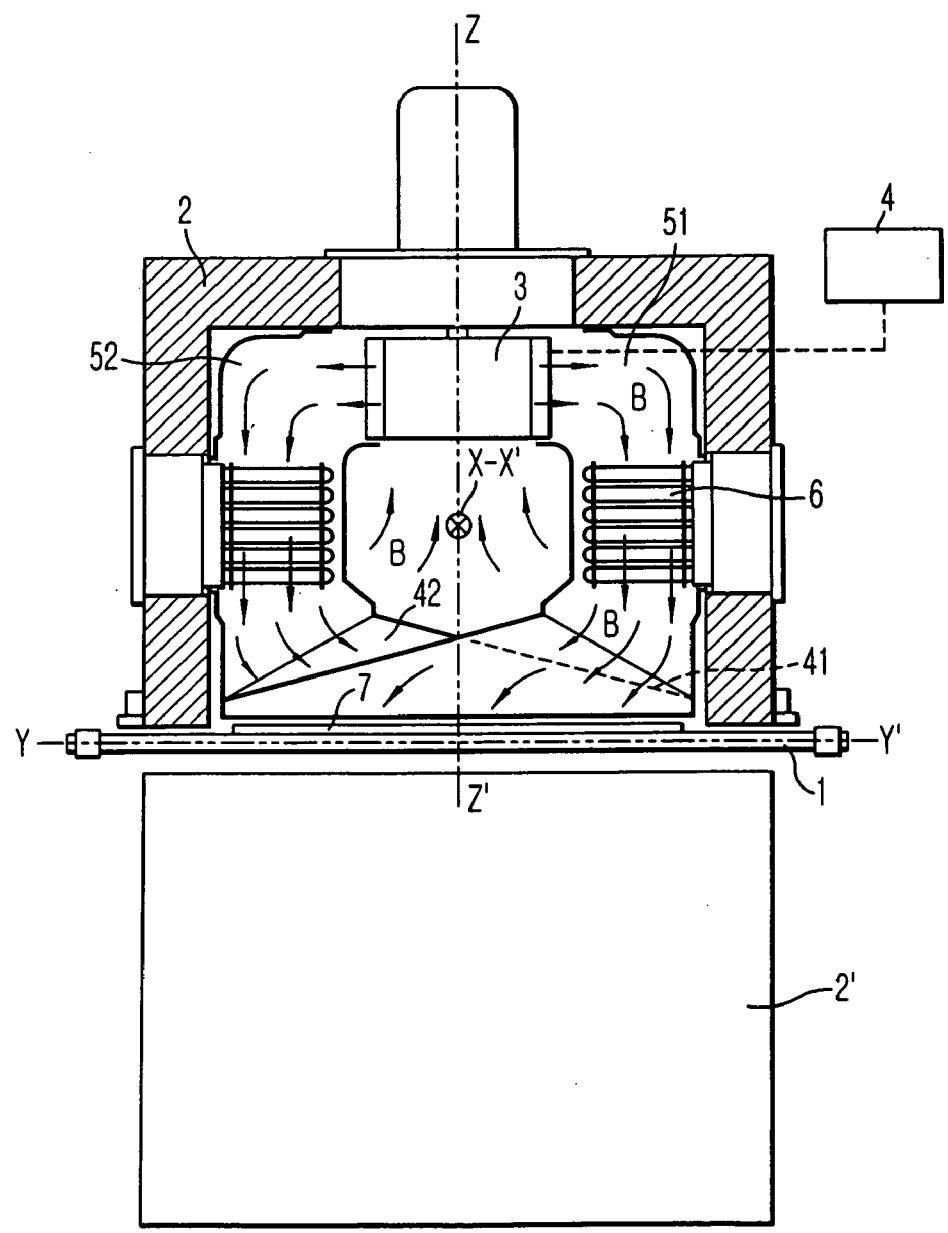

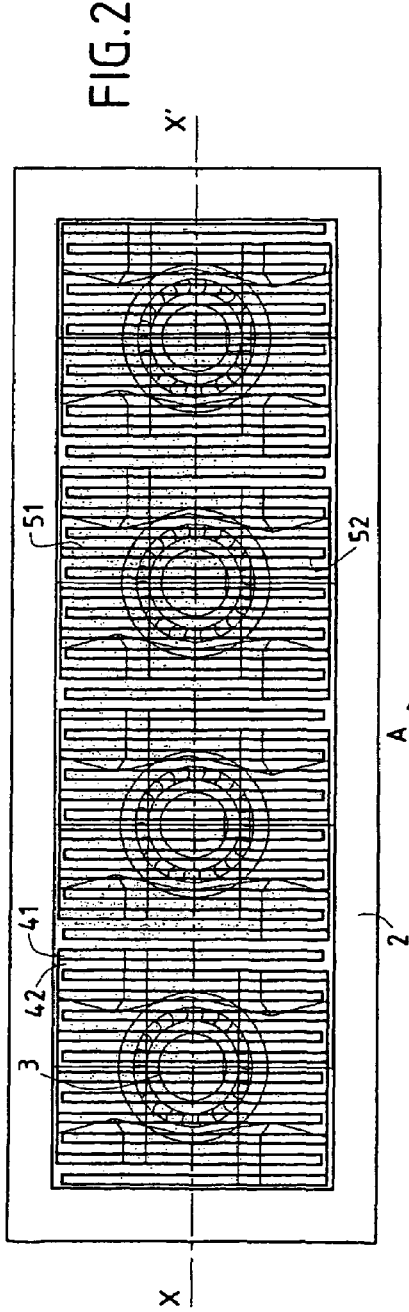
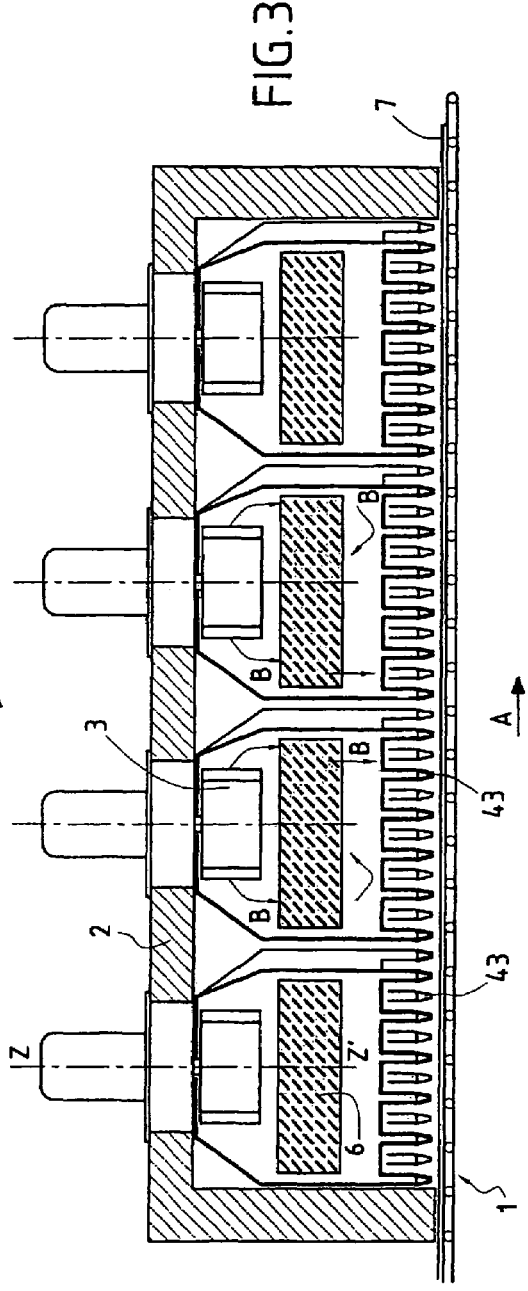

DEVICE FOR BLOWING A FLUID ON AT LEAST A SURFACE OF A THIN ELEMENT AND ASSOCIATED BLOWING UNIT

The present invention relates to the field of devices intended for blowing a gas onto a moving surface, such as a band material; blowing may be carried out either on a single face or on both faces of the band.

Such devices are used, in particular, in the thermal treatment of bands of material, such as bands of glass, fabrics, sheet metals or other materials.

The abovementioned blowing allows heat exchange (heating, cooling) of the band which is movable in relation to the blowing device. Preferably, the band is in movement and the blowing device is stationary.

Many devices of this type are known, in particular devices for blowing hot air onto the two faces of a moving glass band.

Thus, the U.S. Pat. No. 5,647,882 describes a treatment containment, through which a glass sheet travels. Hot-air blowing takes place on both faces of the glass, particularly by means of fans associated with heating means and cooperating with nozzles which blow directly onto both faces of the travelling sheet. The assembly is symmetrical with respect to the plane of the sheet.

The fans are of the crossflow type, and they are fastened to a longitudinal wall of the containment both above and below the sheet.

This arrangement has, in particular, the disadvantage of not blowing the air onto the entire surface of the glass in a highly homogeneous manner and of having poor air output efficiency, particularly because of the tangential fans.

The U.S. Pat. No. 5,150,534 is also known, which discloses another arrangement of elements for blowing on both faces of a glass band.

This arrangement has a central point of symmetry, with two fans arranged "head to foot" above and two fans likewise arranged "head to foot" below the surface of the glass.

The fans are of the crossflow-type, and they are fastened to the side walls of the containment. These fans, associated with heating means, feed hot air to an assembly of nozzles which discharge the air perpendicularly to the direction of travel of the glass plate.

The assembly is complex and difficult to implement because only the simultaneous functioning of the four fans can make it possible to achieve some degree of homogeneity in the distribution of the flows on the two sides of the glass.

Moreover, such assemblies are difficult to arrange in series on continuous furnaces, particularly on account of the different temperatures generated by each assembly.

Furthermore, the document DE 4219003 is known, according to which fans fastened to the upper wall of the treatment containment and associated with pipes and with a battery of nozzles make it possible to blow hot air onto one of the faces of the glass band by means of at least one assembly of nozzles arranged parallel to the direction of travel of the glass band.

This orientation, moreover, may induce defects in the glass.

Furthermore, the fact that the nozzles discharge the air only onto one of the faces of the glass at a given location may give rise to stresses, deformations and other defects which are not desirable.

It therefore appears desirable to design an air-blowing device of the type defined in the introduction to the description, which, in particular, overcomes the abovementioned disadvantages.

The present invention offers a both simple and reliable solution to the problem of homogenizing the temperature of the air flow which sweeps over the surface (or both surfaces) of a glass band.

Moreover, it is easy to implement.

In addition, the present invention makes it possible to produce heated zones of limited dimensions, with different temperatures, this being useful, in particular, in the case of application to continuous furnaces.

The subject of the present invention is, therefore, a device for blowing a fluid onto at least one face of a thin element of the band type, comprising, within a containment having a horizontal longitudinal axis (XX') corresponding to the axis of travel of the band, at least one radial-flow fan with a vertical axis (ZZ'), having at least one outlet connected to at least one pipe for feeding nozzles directed towards the said face.

According to the invention, the nozzles induce fluid jets in at least one plane perpendicular to the direction (XX') of travel of the said band, and the axis (ZZ') of the said fan is arranged generally in the vicinity of the longitudinal axis of the containment. In general, the axis (ZZ') is perpendicular to the direction (XX'). The axis (ZZ') may, for example, be at a distance from the longitudinal axis of the containment of at least 35% of the internal width of the containment or even of less than 25% of the internal width of the containment. The axis (ZZ') may intersect the longitudinal axis of the containment, particularly when the device according to the invention comprises, on one side of the thin element, in cross section, only a single fan with two radial outlets (as regards the device of FIG. 1).

This characteristic arrangement has the advantage of a greater homogeneity in the flow.

Preferably, the device according to the invention comprises two diametrically opposite radial pipes, each feeding at least one series of transverse parallel nozzles defined between plates, and the cross section of the said pipe is not constant.

Advantageously, the said nozzles originating from each of the pipes are arranged alternately along the longitudinal axis (XX') of the containment, the pitch being at least one nozzle.

This arrangement of the intermingled nozzles ensures a good distribution of the flow. Moreover, if one of the feed pipes is obstructed (malfunction), the flow nevertheless arrives uniformly on the surface by means of the other pipe which delivers the flow to the other series of nozzles.

According to one embodiment of the invention, a device which comprises a single fan having two radial outlets is provided.

According to another embodiment of the invention, two fans are envisaged, which each have one radial outlet.

According to an additional characteristic of the invention, the cross section of the pipe (or pipes) for feeding the nozzles is not constant.

Whatever the shape of the travelling band, the said nozzles induce air jets directed perpendicularly to the surface of the thin band element. In general, the nozzles are not contiguous, so that the air emanating from the nozzles can circulate between them. In this case, the air jets emanating from the nozzles strike the thin band-type element, and the air can flow back rearwards, circulate between the nozzles and refeed the fan.

Preferably, the said nozzles originating from each of the pipes have an overlap zone over all or part of the width of the containment.

The device according to the invention applies a highly homogeneous treatment over the entire width of the thin element. To be precise, for a given nozzle, the fluid flow which it ejects does not, in general, have exactly the same characteristics (speed and/or temperature) at its two ends. In the device according to the invention, then, the homogeneity defects brought about by a nozzle fed by one of the pipes (51) are immediately compensated by the same defects brought about by another nozzle fed by the other pipe (52), since these pipes (51, 52) are arranged alternately along the axis (X,X'). The fact that the nozzles are not contiguous also contributes to achieving high homogeneity because the fluid circulates more easily.

The present invention does not apply solely to flat thin elements. The elements may be curved, for example of semi-cylindrical shape.

Furthermore, in application to the heating of thin bands, the device according to the invention comprises means for heating the fluid in the containment, such as, for example, electrical resistors or gas burners.

The heating means may be of the radiant type, with, for example, one or more electrical resistors.

Without departing from the scope of the invention, the blowing device may be arranged on both faces of the thin band.

Moreover, the containment may comprise a plurality of fans aligned along its longitudinal axis.

Thus, the device according to the invention comprises means 4 intended for individually controlling and adjusting the temperature and/or the flow rate of the fluid emanating from each fan, in order to have particular temperature profiles in the region of blowing on the thin band.

The invention is aimed, moreover, at a unit for blowing a fluid onto the two faces of a thin element of the band type, comprising a blowing device on one of the faces, associated with another blowing and/or heating means of the radiant or convective type on the other face. The said other face may likewise be subjected to heat transfer by conduction (conductive means); this applies, in particular, to the situation where the thin element is displaced under the action of successive rollers, contact between the thin element and the rollers being capable of causing a transfer of heat by conduction from the rollers towards the thin element, or vice versa.

Other characteristics, details and advantages of the invention will emerge more clearly from a reading of the following description given in an illustrative and in no way limiting way, with reference to the accompanying drawings in which:

FIG. 1 is a simplified cross section of an embodiment of the invention;

FIG. 2 is a top view of the invention, and

FIG. 3 is a simplified longitudinal section of the said embodiment of the invention.

Figure 4:
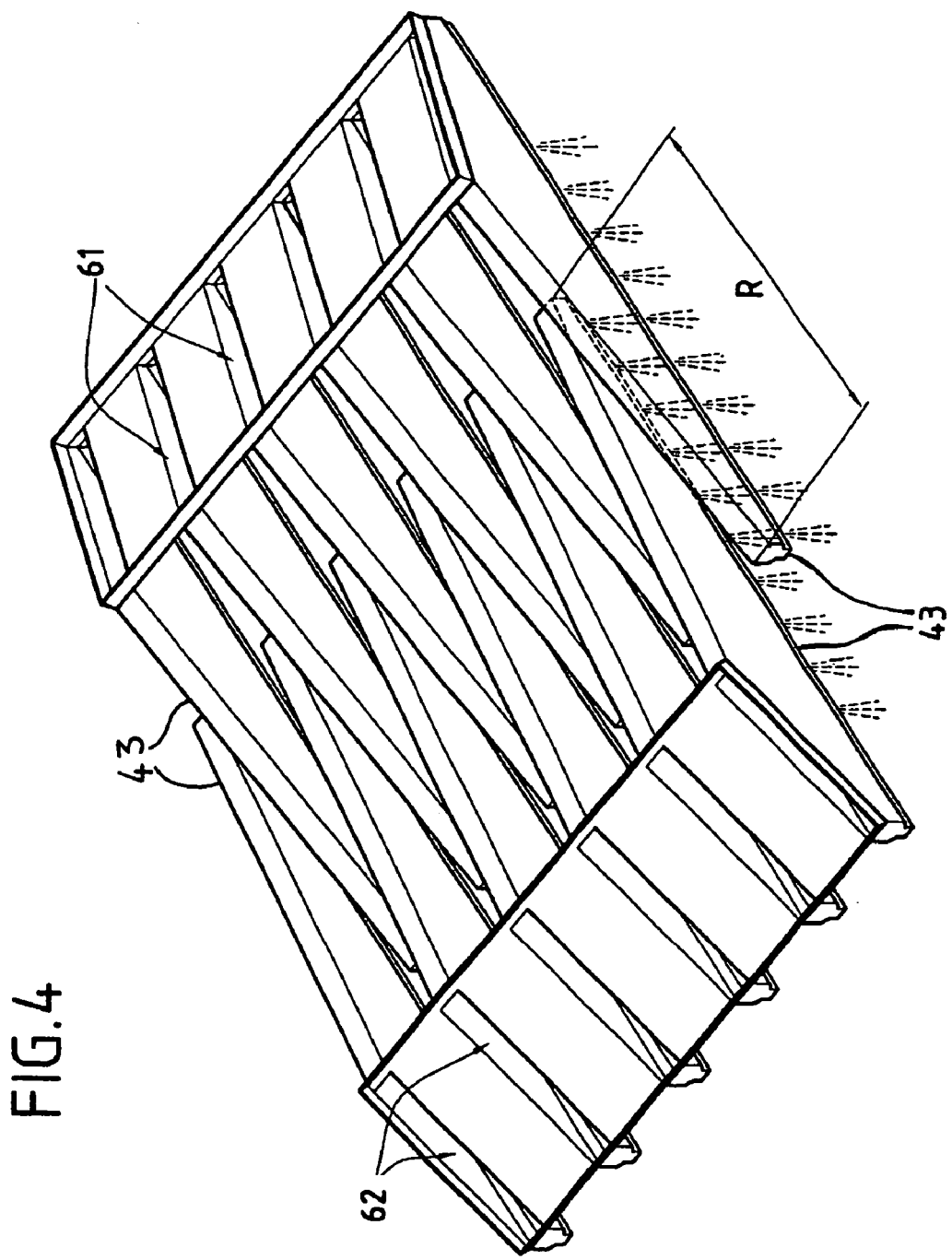

FIG. 4 is a perspective view of a pair of nozzles arranged alternately and alternating at a pitch of one nozzle. The pair of nozzles comprises an overlap zone (R). In this figure, the nozzles are not contiguous, so that the air can circulate between them. This figure is a view from the side for the feed of fluid to the nozzles. The fluid arriving via the pipes (51, 52) passes into the orifices (61, 62) in order to be ejected through the nozzles (43) in the direction of the thin element.

Figure 5:
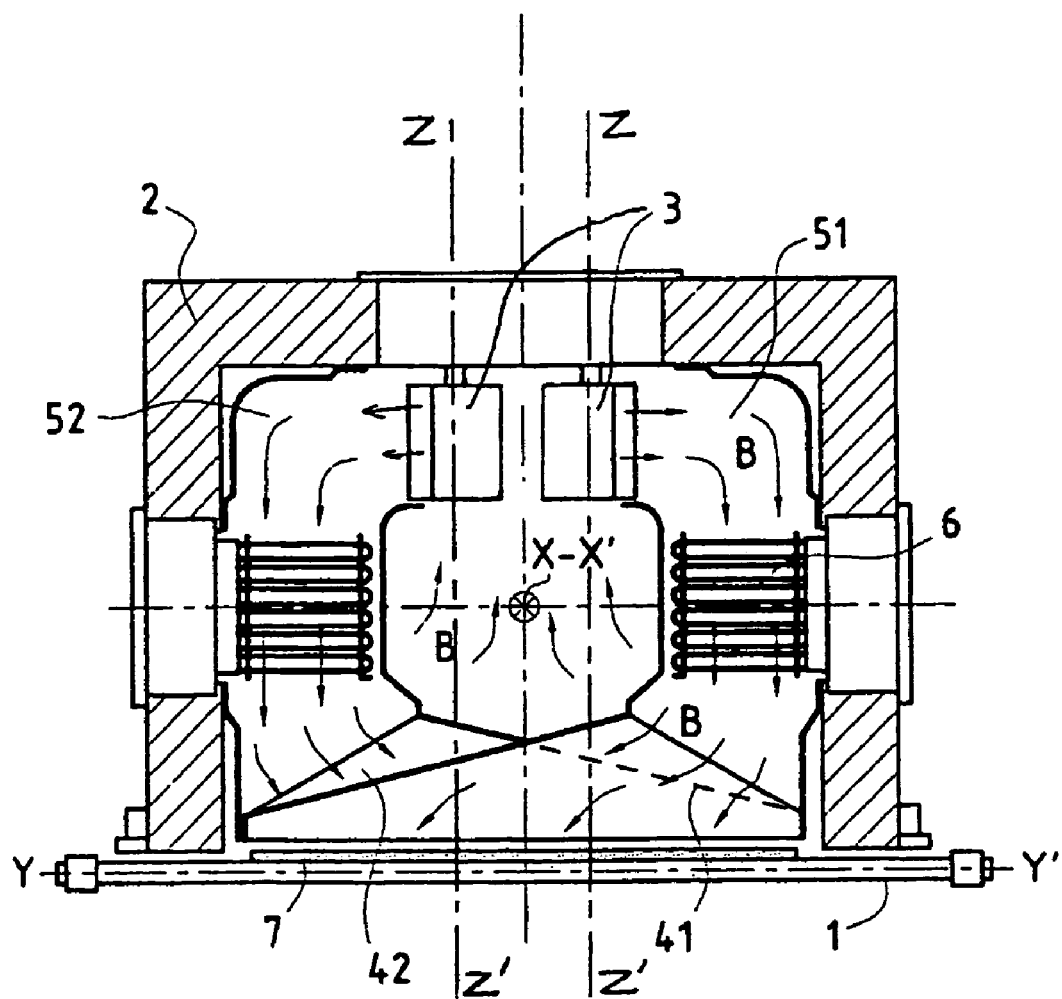

FIG. 5 is a simplified cross section of an embodiment of the invention comprising two fans which each have a single radial outlet.

FIG. 1 illustrates, in cross section, the main elements of an embodiment of the invention.

The thin band 7 is displaced perpendicularly to the sectional plane on rollers 1 parallel to one another, of any type known per se and with a horizontal axis YY'.

The band 7 passes through the parallelepiped containment 2, within which the component means of the invention are located. The containment 2 may comprise five walls consisting of insulating material made from ceramic fibres.

According to this embodiment of the invention, the lower limit of the containment 2 is formed by the assembly of rollers 1 which support and transport the thin sheet 7.

Above the band 7 issue nozzles 43 defined by plates 41, 42 parallel to one another so that the fluid jets discharged from the nozzles 43 towards the thin band 7 are contained in "transverse" planes, that is to say planes perpendicular to the plane of the band 7 and to the longitudinal axis XX' of the containment 2.

One or more feed pipes 51, 52 connect the fins 41, 42 to the outlet (or outlets) of a fan 3 having preferably a vertical axis ZZ' and located centrally, that is to say near the longitudinal axis XX' of the containment 2.

According to the embodiment illustrated in FIGS. 1 to 3, each blowing unit comprises a fan 3 having two diametrically opposite radial outlets which are each connected to a feed pipe 51, 52 which itself distributes the fluid through the fins 41, 42 forming the nozzles 43.

As becomes clearer from FIG. 2, the plates originating from each pipe 51, 52 are arranged so as to form nozzles 43 discharging the fluid emanating alternately from one pipe 51 and from the other 52.

The pitch between the nozzles of varying origin may be one or more nozzles.

Moreover, the nozzles 43 originating from each pipe 51, 52 may have a greater or lesser overlap zone, depending on the width of the containment: in FIGS. 1 and 2, this overlap zone is substantially equal to the entire width of the containment 2; this arrangement is selected so as to ensure greater homogeneity.

A smaller overlap zone may, of course, be provided, without departing from the scope of the present invention.

Preferably, but not necessarily, the cross section of each pipe 51, 52 is not constant; to be precise, FIG. 2 shows a cross section increasing from each outlet of the fan as far as the region of the fins 41, 42.

Furthermore, heating elements 6 may be provided, within the feed pipes 51, 52. These means may be of the radiant type, such as resistors or else gas burners.

They may be fastened to the side walls of the containment.

The general movement of the fluid within the containment 2 is as indicated by the arrows B in FIGS. 1 and 3.

This movement, quasi-symmetrical with respect to the vertical axis ZZ' of each blowing unit, allows both an optimum and a homogeneous distribution of the fluid on the surface to be treated.

Moreover, the arrangement of the various components, in particular the fans 3 and the heating means 6, ensures easy reliable access in the event of repair and/or maintenance.

When the containment comprises a plurality of fans 3, means are likewise envisaged for separately adjusting and controlling the temperature and/or the flow rate of the fluid emanating from each of the fans. Any means known per se may be used for this function.

Particular temperature profiles suitable for the level of blowing on the band are thus obtained. This modularity is then highly esteemed by users.

Furthermore, the subject of the invention is a blowing/heating unit comprising either a device, as described above, on each of the faces of the band or a device, described above, which blows onto one face, associated with another blowing and/or heating means of the radiant or convective type on the other face. For example, FIG. 1 shows a blowing device 2' arranged on another face of the thin element.

What is claimed is:

1. Device configured to blow a fluid onto at least one face of a thin element, comprising:
    a containment having a horizontal longitudinal axis corresponding to an axis of a direction of travel of the thin element;
    at least two series of transverse parallel nozzles disposed within the containment and arranged transverse to the direction of travel of the thin element and directed towards the at least one face of the thin element;
    at least one radial-flow fan with a vertical axis within the containment, the at least one radial-flow fan including at least one outlet connected to feed the fluid to the at least two series of transverse parallel nozzles directed towards the at least one face of the thin element; and
    two diametrically opposite radial pipes,
    wherein the nozzles induce fluid jets in at least one plane perpendicular to the direction of travel of the thin element,
    wherein the vertical axis of the fan crosses the horizontal longitudinal axis of the containment, and
    wherein the at least one outlet is connected in fluid communication with the at least two series of transverse parallel nozzles via the two diametrically opposite radial pipes, and each radial pipe is connected to feed the fluid to one series of transverse parallel nozzles not fed the fluid by the other radial pipe, and each radial pipe extends from the at least one outlet in a direction perpendicular to the direction of travel of the thin element.

2. Device according to claim 1, wherein pitches of the nozzles alternate.

3. Device according to claim 1, wherein the nozzles have an overlap zone over all or part of a width of the containment.

4. Device according to claim 1, wherein the nozzles are arranged alternately along the horizontal longitudinal axis of the containment.

5. The device according to claim 4, wherein each of the two diametrically opposite radial pipes is connected to feed the fluid to the alternately arranged nozzles, and the alternately arranged nozzles are above the thin element.

6. Device according to claim 1, wherein the vertical axis of the fan is disposed in a vicinity of the horizontal lingitudinal axis of the containment.

7. Device according to claim 1, comprising a single fan having two radial outlets.

8. Device according to claim 7, wherein the vertical axis of the fan crosses the horizontal longitudinal axis of the containmnet.

9. Device according to claim 1, wherein the at least one fan comprises two fans, each having a radial outlet.

10. Device according to claim 1, wherein a cross section of the at least one pipe is not constant.

11. Device according to claim 1, wherein the nozzles are configured to induce jets perpendicularly to a surface of the thin element.

12. Device according to claim 1, further comprising:
    means for heating a fluid in the containment.

13. Device according to claim 12, wherein the means for heating comprise an electrical resistor.

14. Device according to claim 1, further comprising:
    means for transferring heat with the thin element.

15. Device according to claim 1, wherein the nozzles are configured so as not to be contiguous so that air flowing from the nozzles is permitted to flow back rearwards and to circulate between the nozzles.

16. Device according to claim 1, wherein the at least one fan comprises a plurality of fans aligned along the horizontal longitudinal axis of the containment.

17. Device according to claim 16, further comprising:
    means for controlling and adjusting at least one of temperature and flow rate of the fluid fed by the fans, to have predetermined temperature profiles in a region of blowing on the thin element.

18. Device according to claim 1, arranged on two faces of the thin element.

19. Device according to claim 1, further comprising:
    rollers configured to move the thin element.

20. Unit connected to blow fluid onto faces of a thin element, comprising:
    the device according to claim 1; and
    means for blowing or heating another face of the thin element.

21. Unit connected to blow fluid onto first and second faces of a thin element, comprising:
    the device according to claim 1 configured to heat the first face; and
    means for transferring heat to the second face.

22. The device according to claim 1, wherein each nozzle extends from an edge of the thin element beyond the vertical axis of the fan in a direction transverse to a direction of travel of the thin element.

23. The device according to claim 22, wherein each nozzle is shorter as measured in the direction of travel of the thin element than in a direction transverse to the thin element.

24. The device according to claim 1, wherein each nozzle includes an open portion overlapping the vertical axis of the fan.

25. Device configured to blow a fluid onto at least one face of a thin element, comprising:
    a containment having a horizontal longitudinal axis corresponding to an axis of a direction of travel of the thin element;
    at least two series of transverse parallel nozzles disposed within the containment and arranged transverse to the direction of travel of the thin element and directed towards the at least one face of the thin element;
    at least one radial-flow fan with a vertical axis within the containment, the at least one radial-flow fan including at least one outlet connected to feed the fluid to the at least two series of transverse parallel nozzles directed towards the at least one face; and
    two diametrically opposite radial pipes,
    wherein the nozzles are configured to induce fluid jets in at least one plane perpendicular to the direction of travel of the thin element, and
    wherein the at least one outlet is connected influid communication with the at least two series of transverse parallel nozzles via the two diametrically opposite radial pipes, and each radial pipe is connected to feed the fluid to one series of transverse parallel nozzles not fed the fluid by the other radial pipe, and each radial pipe extends from the at least one outlet in a direction perpendicular to the direction of travel of the thin element.

26. Device according to claim 25, wherein the nozzles are arranged alternately along the horizontal longitudinal axis of the containment.

27. Device according to claim 26, wherein pitches of the nozzles alternate.

28. Device according to claim 26, wherein the nozzles have an overlap zone over all or part of a width of the containment.

29. Device according to claim 25, wherein the vertical axis of the fan is disposed in a vicinity of the horizontal longitudinal axis of the containment.

30. Device according to claim 25, wherein the at least one fan comprises a single fan having two radial outlets.

31. Device according to claim 25, wherein the at least one fan comprises two fans, each having a radial outlet.

32. Device according to claim 25, wherein a cross section of the at least one pipe is not constant.

33. Device according to claim 25, wherein the nozzles are configured to induce jets perpendicularly to a surface of the thin element.

34. Device according to claim 25, further comprising:
    means for heating a fluid in the containment.

35. Device according to claim 34, wherein the means for heating comprise an electrical resistor.

36. Device according to claim 25, further comprising:
    means for transferring heat with the thin element.

37. Device according to claim 25, wherein the nozzles are configured so as not to be contiguous so that air flowing from the nozzles is permitted to flow back rearwards and to circulate between the nozzles.

38. Device according to claim 25, wherein the at least one fan comprises a plurality of fans aligned along the horizontal longitudinal axis of the containment.

39. Device according to claim 38, further comprising:
    means for controlling and adjusting at least one of temperature and flow rate of the fluid fed by the fans, to have predetermined temperature profiles in a region of blowing on the thin element.

40. Device according to claim 25, arranged on two faces of the thin element.

41. Device according to claim 25, further comprising:
    rollers configured to move the thin element.

42. Unit configured to blow fluid onto faces of a thin element, comprising:
    the device according to claim 25; and
    a means for blowing or heating another face of the thin element.

43. Device configured to blow a fluid onto at least one face of a thin element, comprising:
    a containment having a horizontal longitudinal axis corresponding to an axis of a direction of travel of the thin element;
    at least two series of transverse parallel nozzles disposed within the containment and arranged transverse to the direction of travel of the thin element and directed towards the at least one face of the thin element;
    two diametrically opposite radial pipes,
    at least one radial-flow fan with a vertical axis in the containment, the at least one radial-flow fan including two radial outlets connected to the two diametrically opposite radial pipes connected to feed the fluid, respectively, to the at least two series of transverse parallel nozzles directed towards the at least one face of the thin element; and
    wherein the nozzles induce fluid jets in at least one plane perpendicular to the direction of travel of the thin element, and
    wherein the two radial outlets are connected to the two diametrically opposite radial pipes, respectively, and each radial pipe is connected to feed the fluid to at least one series of transverse parallel nozzles not fed fluid by the other radial pipe, and each radial pipe extends from the at least one outlet in a direction perpendicular to the direction of travel of the thin element.

44. Device according to claim 43, wherein the nozzles are arranged alternately along the horizontal longitudinal axis of the containment.

* * * * *